(12) United States Patent
Nishiuchi

(10) Patent No.: US 7,512,494 B2
(45) Date of Patent: Mar. 31, 2009

(54) VEHICLE MOUNTED IMAGE PROCESSOR AND METHOD OF USE

(75) Inventor: Hidekazu Nishiuchi, Chiba (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 347 days.

(21) Appl. No.: 11/432,894

(22) Filed: May 12, 2006

(65) Prior Publication Data

US 2006/0256198 A1 Nov. 16, 2006

(30) Foreign Application Priority Data

May 13, 2005 (JP) ............................. 2005-141186

(51) Int. Cl.
*G06F 17/00* (2006.01)
*G06K 9/00* (2006.01)

(52) U.S. Cl. ..................... 701/300; 701/1; 382/154; 382/103; 382/169; 348/208.1; 348/155

(58) Field of Classification Search ............... 701/1, 701/300; 382/154, 103, 169; 348/208.1, 348/155

See application file for complete search history.

(56) References Cited

U.S. PATENT DOCUMENTS

| 5,739,848 | A  | * | 4/1998  | Shimoura et al. ........... 348/119 |
| 6,531,959 | B1 |   | 3/2003  | Nagaoka et al. |
| 6,963,661 | B1 | * | 11/2005 | Hattori et al. ............... 382/154 |
| 7,015,952 | B2 | * | 3/2006  | Okada ...................... 348/208.1 |
| 7,362,881 | B2 | * | 4/2008  | Hattori et al. ............... 382/103 |
| 2004/0057599 | A1 | * | 3/2004 | Okada et al. ................ 382/103 |
| 2006/0078165 | A1 |   | 4/2006 | Watanabe |

FOREIGN PATENT DOCUMENTS

JP 2001-084497 3/2001

OTHER PUBLICATIONS

Okada R. et al., "Obstacle Detection Using Projective Invariant and Vanishing Lines", International Conference on Computer Vision, IEEE Comp. Soc, US, vol. 2 of 2, Oct. 2003, pp. 330-337.
European Search Report dated Aug. 11, 2006.

* cited by examiner

*Primary Examiner*—Khoi H. Tran
*Assistant Examiner*—Ronnie Mancho
(74) *Attorney, Agent, or Firm*—Young Basile

(57) ABSTRACT

A vehicle-mounted detecting device and corresponding method for detecting a distance between the vehicle and an object outside the vehicle. The detecting device extracts edge intersection points from images of individual frames photographed by a camera. A set of edge intersection points for which the relative position in images does not change between frames is then specified as an observation point group; the movement of the specified observation point group in images is observed; and pitching by the vehicle is detected. Any two points with differing heights on an object present in an image are extracted as feature points, and after the effect of pitching is eliminated from the feature points, the position of a vanishing line in the image is calculated based on the ratio of the velocities of the feature points in images after the length between the two feature points and the effects of pitching are eliminated.

19 Claims, 8 Drawing Sheets

OBSERVATION POINT EXTRACTION

OBSERVATION POINT (EXTRACTION RESULT)
OBSERVATION POINT CANDIDATE

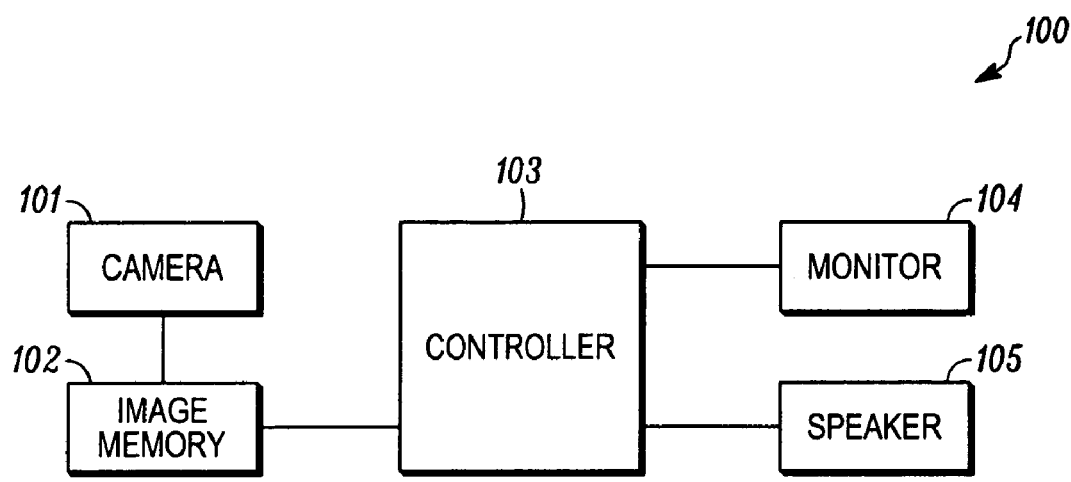
FIG. 1
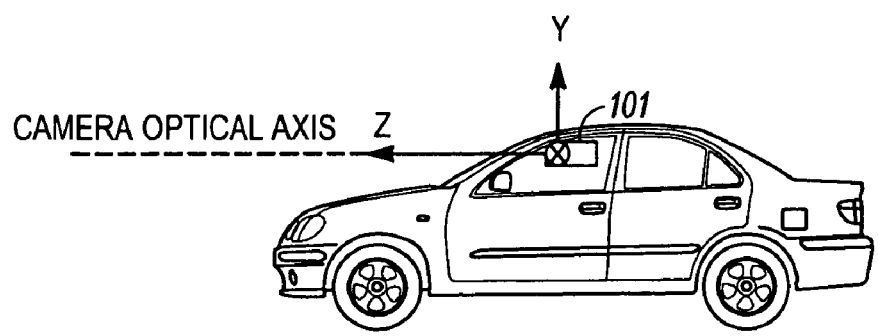
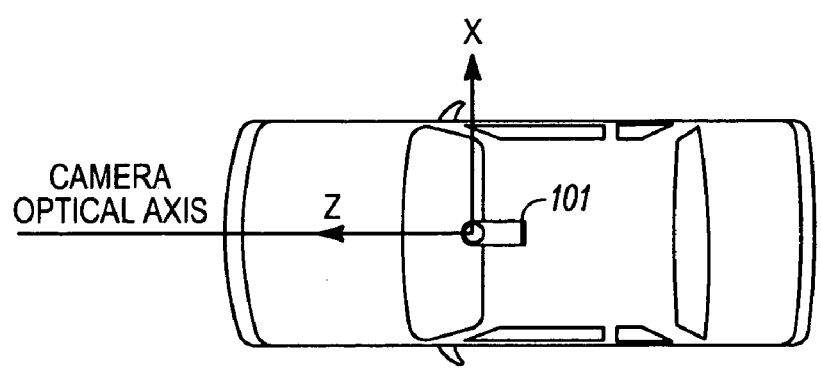
FIG. 2

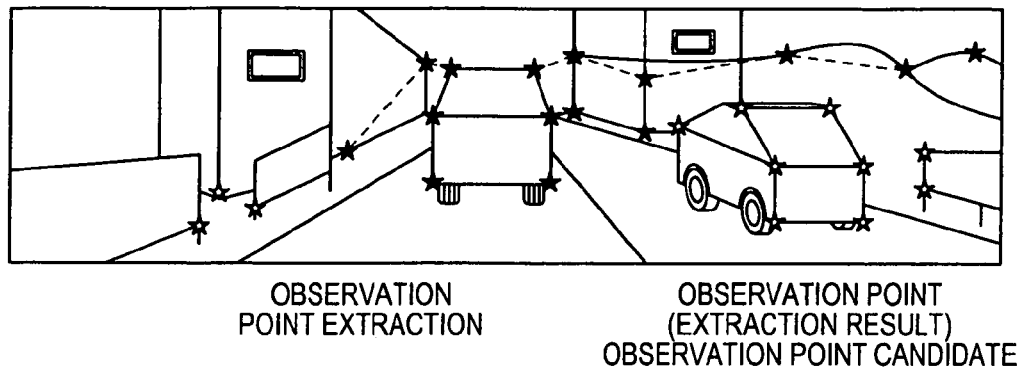

OBSERVATION POINT EXTRACTION  OBSERVATION POINT (EXTRACTION RESULT) OBSERVATION POINT CANDIDATE

FIG. 4

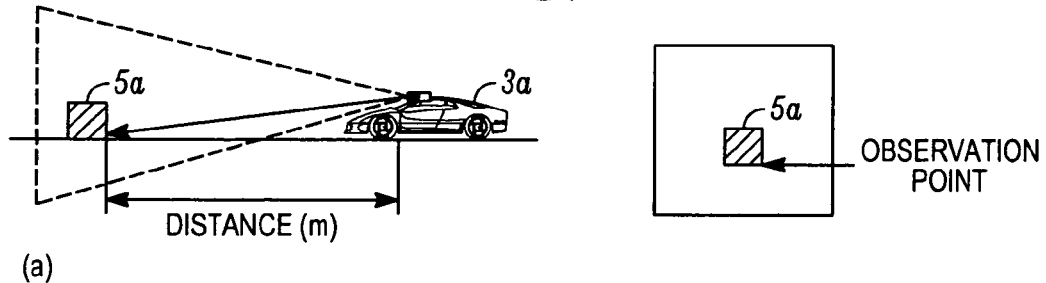

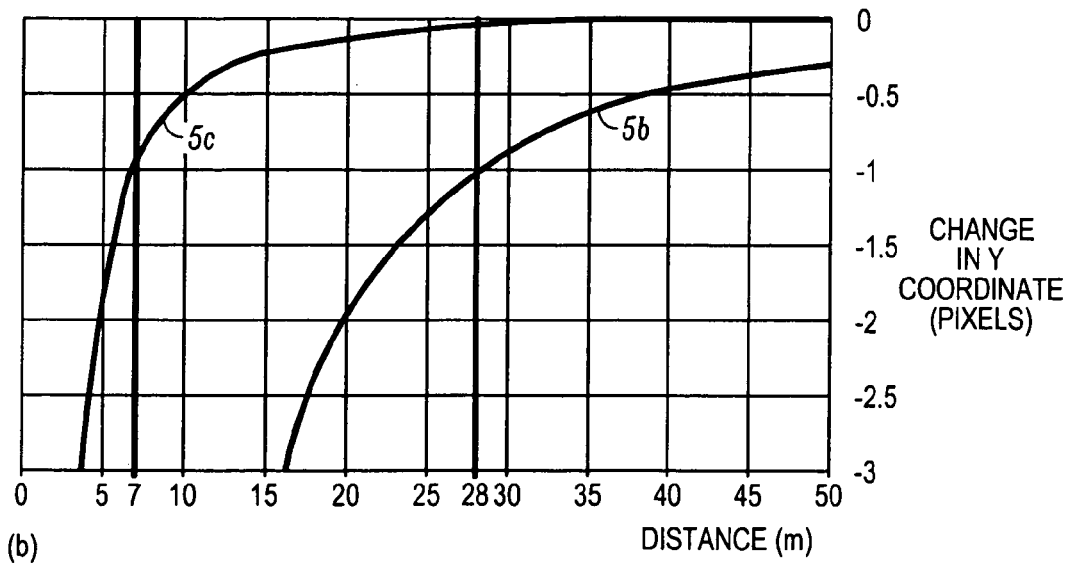

CHANGE IN Y COORDINTE PER FRAME BY VEHICLE'S APPROACHING

A NEARBY OBJECT APPEARS STATIONARY ON THE SCREEN BY SPEEDING UP THE PROCESSING RATE

→ THERE IS NO CHANGE IN Y COORDINATE DUE TO CHANGE IN RELATIVE DISTANCE DURING THIS PERIOD

→ CHANGE IN Y COORDINATE DURING THIS PERIOD IS DUE TO PITCHING ONLY

FIG. 5

VANISHING LINE CALCULATION $$\frac{dy1}{dy2} = \frac{h1}{h2}$$

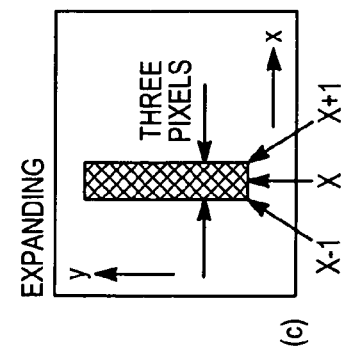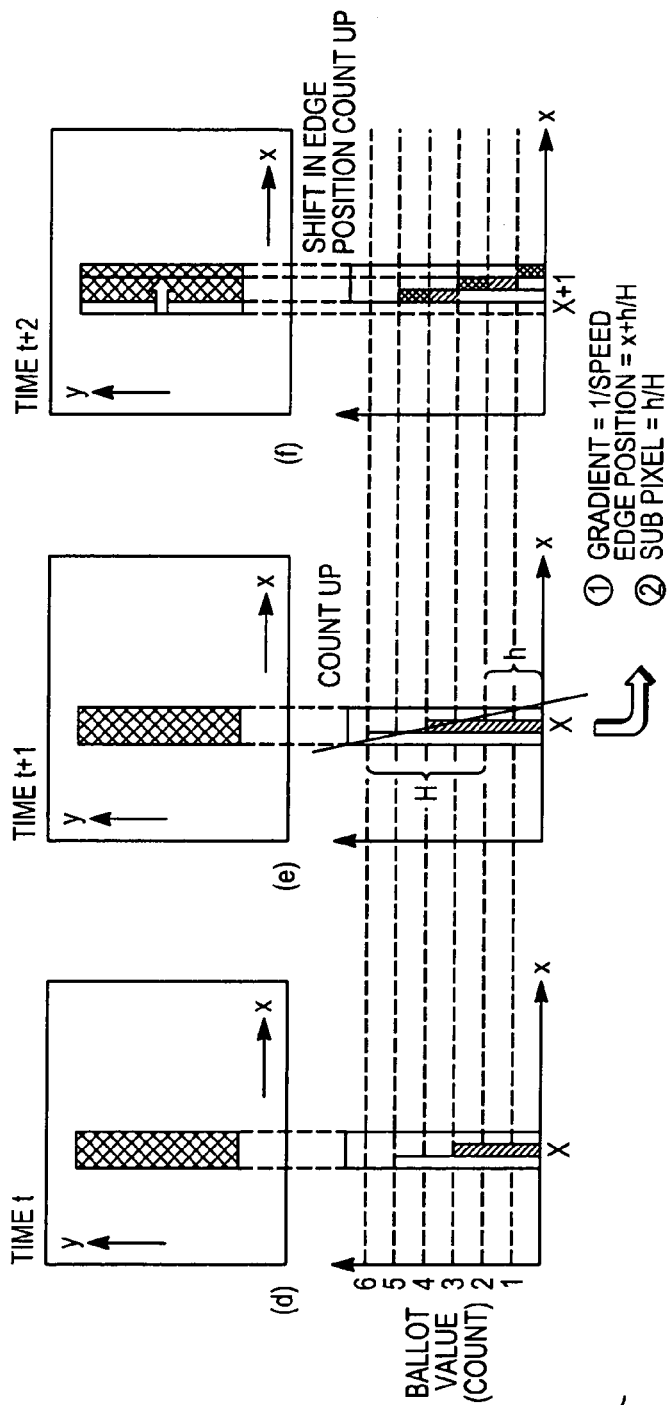
FIG. 10
FIG. 11

VEHICLE MOUNTED IMAGE PROCESSOR AND METHOD OF USE

TECHNICAL FIELD

The present invention relates in general to automotive vehicles and more particularly to a vehicle-mounted image processor for processing images photographed by a camera and an image processing method.

BACKGROUND

Detectors for detecting relative distance between objects are known. One such detector is disclosed in Japanese Kokai Patent Application No. 2001-084497. With this position detector, the amount of movement in the vertical orientation between picture frames for an object detected on photographed images can be measured and the amount of change in the vehicle pitching angle can be calculated based on the amount of movement. However, in the existing device, the amount of pitching change in the current frame is calculated based on the amount of movement in the vertical orientation of an object between frames, which is added to the vanishing line position in the previous frame, and the vanishing line position in the current frame is calculated. There may be instances, however, where this may result in the position of the vanishing line for the current frame being miscalculated when movement of an object in the vertical orientation between frames is detected as a result of a change in the relative distance between the vehicle and the object. Accordingly, it is desirable to develop an apparatus and method for more accurately determining a position of a vanishing line used in calculating the distance between the vehicle and an object.

BRIEF SUMMARY OF THE INVENTION

Accordingly, there is provided an apparatus wherein images in an individual from photographed by an imaging means are processed to calculate velocity information for individual pixel images, a velocity information set for which the relative positions between velocity information in images do not change between frames is specified as an observation point group, from the plurality of velocity information calculated, the movement of the specified observation point group in an image is observed to detect pitching of the vehicle, and any two points of differing height on an object present in an image are extracted as feature points, the effect of pitching is eliminated from the feature points, and based on the velocity ratio in the image of the feature points after eliminating the length between the two feature points and the effect of pitching, the position of a vanishing line in the image is calculated. With the present invention, any two points of differing height on an object present in an image are extracted as feature points and the position of a vanishing line in the image is calculated based on the velocity ratio of the feature points in the image after the length between the two feature points and the effect of pitching is eliminated. Because of this, the vanishing line position in the image can be calculated with high precision.

BRIEF DESCRIPTION OF THE DRAWINGS

The description herein makes reference to the accompanying drawings wherein like reference numerals refer to like parts throughout the several views, and wherein:

FIG. 1 is a block diagram showing of a vehicle-mounted image processor;

FIG. 2 is a side view of a camera installed on the vehicle;

FIG. 4 shows an example of detection results for an observation point candidate group;

FIG. 5 shows the changes of camera frame rate and observation points;

FIG. 10 is a view illustrating thin-line condensing operation and expanding operation by the edge-width standardizing section shown in FIG. 9; and FIG. 11 is a view illustrating a count up operation of a balloting module.

DETAILED DESCRIPTION OF EMBODIMENTS OF THE INVENITON

Figure 3:
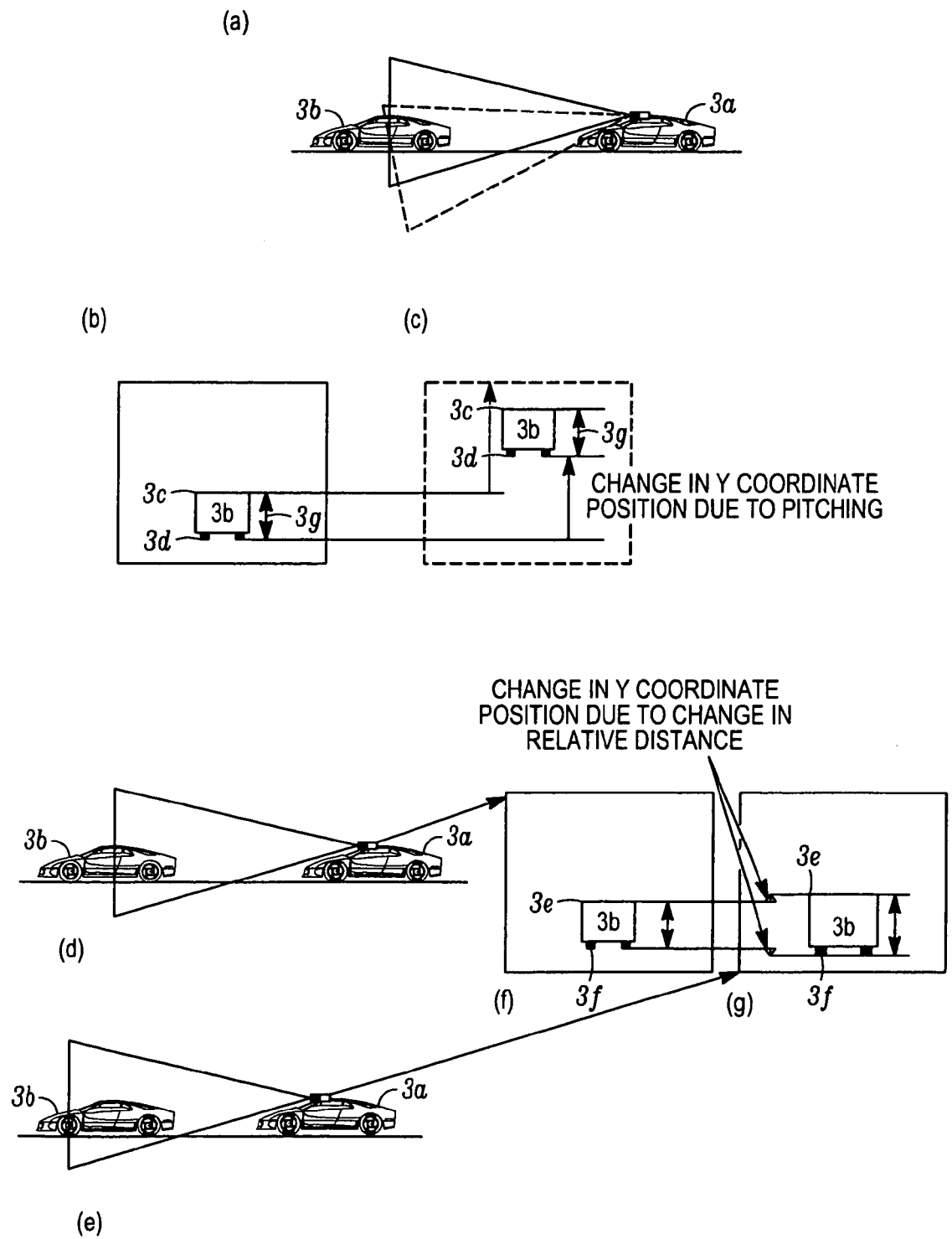
FIG. 3 shows an example of change in relative position in edge intersection point.

FIG. 1 is a functional block diagram showing an image processor 100 that may be mounted to a vehicle. Image processor 100 may include a camera 101 for photographing images in front of the vehicle, an image memory 102 for storing images photographed by camera 101, a controller 103, a monitor 104 for viewing images photographed by camera 101, and a speaker 105 for outputting a warning tone to the operator.

Referring also to FIG. 2, camera 101 is a high-speed camera that has an imaging element, such as a CCD or CMOS, that continually photographs images in front of the vehicle at an extremely small constant time interval Δt, for example 2 milliseconds (frame rate=500 fps (frames per second)), while the vehicle is traveling, and outputs individual frames to image memory 102. Camera 101 may be mounted in the upper part at the front of the vehicle interior, or any other location that provides a reasonably unobstructed view of the front of the vehicle. A visual axis Z of camera 101 is pointed toward the front of the vehicle, and a horizontal axis X of an imaging plane is set to be parallel to the ground surface, and the vertical axis Y of the imaging plane is set to be perpendicular to the ground surface.

Controller 103 processes images from in front of the vehicle photographed by camera 101 to detect pitching that occurs in the vehicle, and calculates the position of a vanishing line in the image. The image photographed by camera 101 is processed and velocity information for individual pixel images may be calculated. Although the intersection point of edges present in an image is calculated as velocity information for individual pixel images, another element in the image for which a velocity component can be detected could also be used as the velocity information.

Because of this, edges in an image are extracted by applying an edge extraction filter, using for example, a Sobel filter, to the image and digitizing it. Then, the edge intersection point at which the edge in the vertical orientation (vertical edge) and the edge in the horizontal orientation (horizontal edge) intersect is extracted to calculate velocity information and, from all the extracted edge intersection points, the set of edge intersection points at which the relative position between edge intersection points between multiple frames does not change are detected as an observation point candidate group.

Referring also to FIG. 3, when vehicle 3a is traveling and maintaining a constant distance behind leading vehicle 3b, as shown in FIG. 3a, a photographed image in which no pitching occurs in the vehicle will be as shown in FIG. 3b, and a photographed image for which pitching occurs will be as shown in FIG. 3c. In this case, the positions of edge intersection points 3c and 3d in the vertical orientation in the images detected from leading vehicle 3b in the photographed images changes with pitching, but the relative positions 3g of the two edge intersection points is kept the same.

In contrast, when vehicle 3a is traveling behind leading vehicle 3b as shown in FIG. 3d, and when the relative velocity of vehicle 3a and leading vehicle 3b decreases and the distance between the two vehicles decreases as shown in FIG. 3e, the photographed images before and after the distance between vehicles decreases will change as shown from FIG. 3f to FIG. 3g. That is, the size of leading vehicle 3b in the photographed images changes significantly in the photographed images as it approaches vehicle 3a, and along with this, the relative positions of edge intersection points 3e and 3f detected from leading vehicle 3b change.

By using this property and detecting edge intersection points at which the relative position of the edge intersection points do not change between frames as an observation point candidate group, the set of edge intersection points whose positions in the vertical orientation in images change only due to the occurrence of pitching can be used as the observation point candidate group without the effect of changes in position in images due to changes in the relative distance between an object and the vehicle, for example, distance between vehicles 3a and 3b. For example, from all the edge intersection points indicated with stars in FIG. 4, the set of edge intersection points indicated with black outlined white stars, for example, is detected as the observation point candidate group.

Then, the observation point candidate group for which the amount of change in vertical position orientation between frames in the images is less than 1 pixel and the amount of change in position is smallest are determined as the observation point group from the group of multiple observation point candidates detected. In this case, the result of observing the observation point candidate group is that even though the amount of change in position between frames is smallest, when the amount of change in position is 1 pixel or more, the frame rate of camera 101 is raised in increments of a prescribed speed (speeded up) and the points are observed again. This is repeated and the frame rate is raised until the amount of change in vertical position of the observation point candidate group for which the change in position is the least becomes less than 1 pixel.

Referring also to FIG. 5, in a situation where vehicle 3a is traveling toward an object 5a present at a position at a prescribed distance and the object 5a is present in the photographed images as shown in FIG. 5a. In this case, when the movement of observation points between frames is observed using any point on object 5a as the observation point, for example, a point on the bottom edge of object 5a, the relative distance between vehicle 3a and object 5a becomes shorter closer to vehicle 3a, so the vertical position of the observation point on the photographed images gradually moves downward in the image.

Therefore, when imaging with an ordinary camera at a low frame rate, the relative distance between vehicle 3a and object 5a and the vertical position of an observation point in the image, that is, the relationship to the y coordinate value, will change as indicated by curve 5b in FIG. 5b. Because of this, at a low frame rate, when the relative distance between vehicle 3a and object 5a is less than 28 m, the vertical position orientation between frames will be 1 pixel or more, and the change in the vertical position of the observation point in the image will be detected with the approach of the vehicle.

In contrast to this, when the change in position of the observation point is observed with the frame rate of camera 101 speeded up, the change will be as indicated by curve 5c. That is, until the relative distance between vehicle 3a and object 5a is less than 7 m, the change in vertical position orientation between frames will be less than 1 pixel. That is, until the vehicle approaches a position of 7 m from object 5a, no change in vertical position of the observation point in the images will be detected accompanying approach by the vehicle, and object 5a will appear stationary on the images.

From the above, a change in vertical position in images accompanying approach by a vehicle can be eliminated for an object present very near to vehicle 3a by speeding up the frame rate of camera 101, so it will be possible to detect observation points for which the amount of change in vertical position is actually less than 1 pixel. Then, because the observation point group detected in this way will be the set of edge intersection points for which the relative positions of the edge intersection points do not change between frames and, in addition, for which the change in vertical position accompanying travel of the vehicle will be less than 1 pixel, then when the observation point group moves vertically, it can be determined that this is due to pitching by the vehicle.

Therefore, by measuring the amount of vertical movement at this time, the amount of pitching can be calculated. When a change in vertical position of the observation point set in images is detected, the amount of the change in vertical position orientation of individual edge intersection points constituting the observation point group, that is, the amount of change in the y coordinate value, is calculated, the average value of the amount of change in position of all the edge intersection points is calculated, and this is calculated as the amount of pitching. The pitching rate between frames can also be calculated by dividing the amount of pitching by the frame rate.

Next, any two points of differing height on an object present in an image are extracted as feature points and the position of a vanishing line in the image is calculated using the two feature points. A method will be explained in which the two points at the top end and the bottom end extracted from the photographed image with the abovementioned processing are used as the two feature points. First, both ends of all the vertical edges present in a photographed image, that is, the top end and the bottom end, are detected. Then, the movement velocity in the images of the detected top end and bottom end of the edges, that is, the image rate, is calculated. The detected vertical edges for which the velocity directions of the top end and the bottom end differ are extracted, and the bottom end is positioned at the very bottom in the photographed image, and the vertical edge that has this bottom end is specified as an edge for vanishing line detection.

Figure 6:
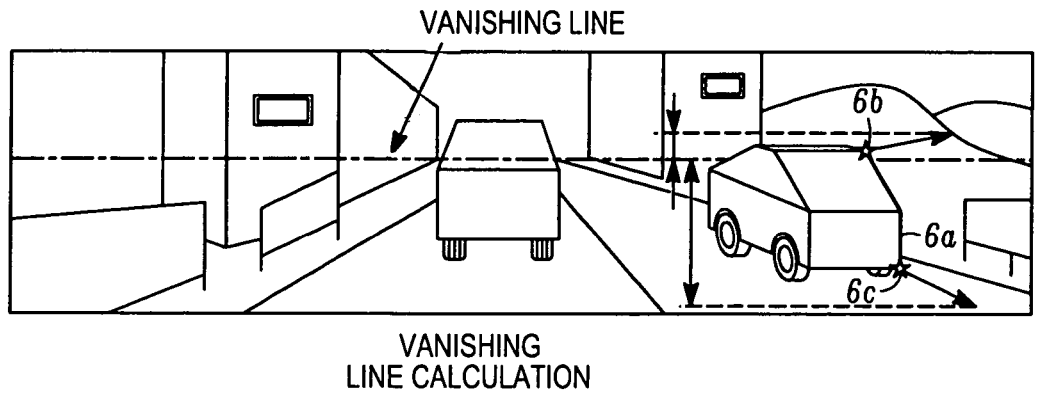
FIG. 6 shows an actual example of an edge for vanishing line detection.

For example, in FIG. 6, vertical edge 6a that has top end 6b and bottom end 6c as the feature points is specified as the edge for vanishing line detection. Edge 6a for vanishing line detection is considered to include a point at which the velocity directions changes along the edge, that is, a point on a vanishing line, because the velocity direction of the top end and the bottom end differ, and the position of the vanishing point in the photographed image can be calculated using the edge for vanishing line detection.

First, the image rate of top end 6b and bottom end 6c of the edges for vanishing line detection is a velocity that also includes the pitching rate when pitching occurs in the vehicle. Consequently, the detected pitching rate is subtracted from the image rate of top end 6b and bottom end 6c of the detected edge with the abovementioned processing. Because of this, the image rate of top end 6b and bottom end 6c of the edge that is not affected by pitching can be calculated as the corrected image rate.

Figure 7:
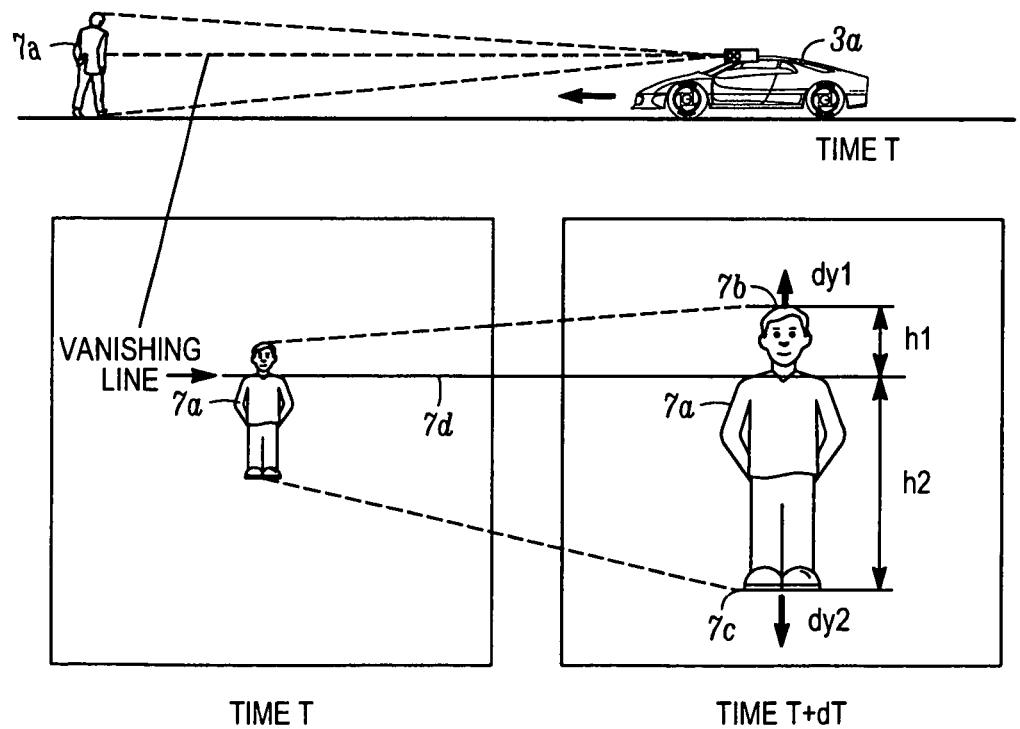
FIG. 7 shows the relationship between the image rates of the top end and bottom end of the edge and the vanishing line position.

The ratio of the corrected image rate of top end 6b and bottom end 6c of the edge will be equal to the ratio of the length from the vanishing line to top end 6b of the edge in the image and the length from the vanishing line to bottom end 6c of the edge in the image. That is, as illustrated in the example in FIG. 7, the ratio of image rate dy1 at top end point 7b of person 7a and of image rate dy2 of bottom end point 7c of person 7a will be equal to the ratio of the length h1 from vanishing line 7d to top end point 7b of person 7a and length h2 from vanishing line 7d to bottom end point 7c of person 7a, and the following formula (1) holds.

$$dy1/dy2 = h1/h2 \quad (1)$$

The position of the vanishing line present between the top end and the bottom end of the edge for vanishing line detection is calculated with formula (1), and the vanishing line position in the photographed image can be calculated by drawing a horizontal line at the vanishing line position in the image.

With the vehicle-mounted processor in this embodiment, the distance to a moving body, for example, a pedestrian, present in images from the vehicle is calculated based on the vanishing line position calculated by the abovementioned processing, and the driver is alerted based on the distance. The distance may be calculated as follows.

First, all photographed images are correlated with already-prepared shape patterns for moving objects, for example, a vehicle or pedestrian. Then, then the object region for which the correlation value with the shape pattern for the moving object is above a prescribed value is specified, and it is determined that a moving object with a shape for which the correlation value is above the prescribed value is present in the object region. After this, the bottommost point of an edge extracted in the object region is detected, and the y coordinate value of the bottommost edge point, the y coordinate value of the vanishing line calculated with the abovementioned processing, and the distance from the vehicle to the moving object are calculated using triangulation based on the height at which camera 101 is installed.

Then, when the calculated distance from the vehicle to the moving object is less than a preset distance, a warning indication is given to the driver over monitor 104 and a warning tone is output through speaker 105. Because of this, the driver can be made aware that a moving object is already present within a predetermined distance from the vehicle and can take action to prevent a collision with the moving object. Note it could also be determined whether a warning is necessary to warn the driver by taking into account the vehicle velocity or driver braking, as well as other vehicle operating parameters.

Figure 8A:
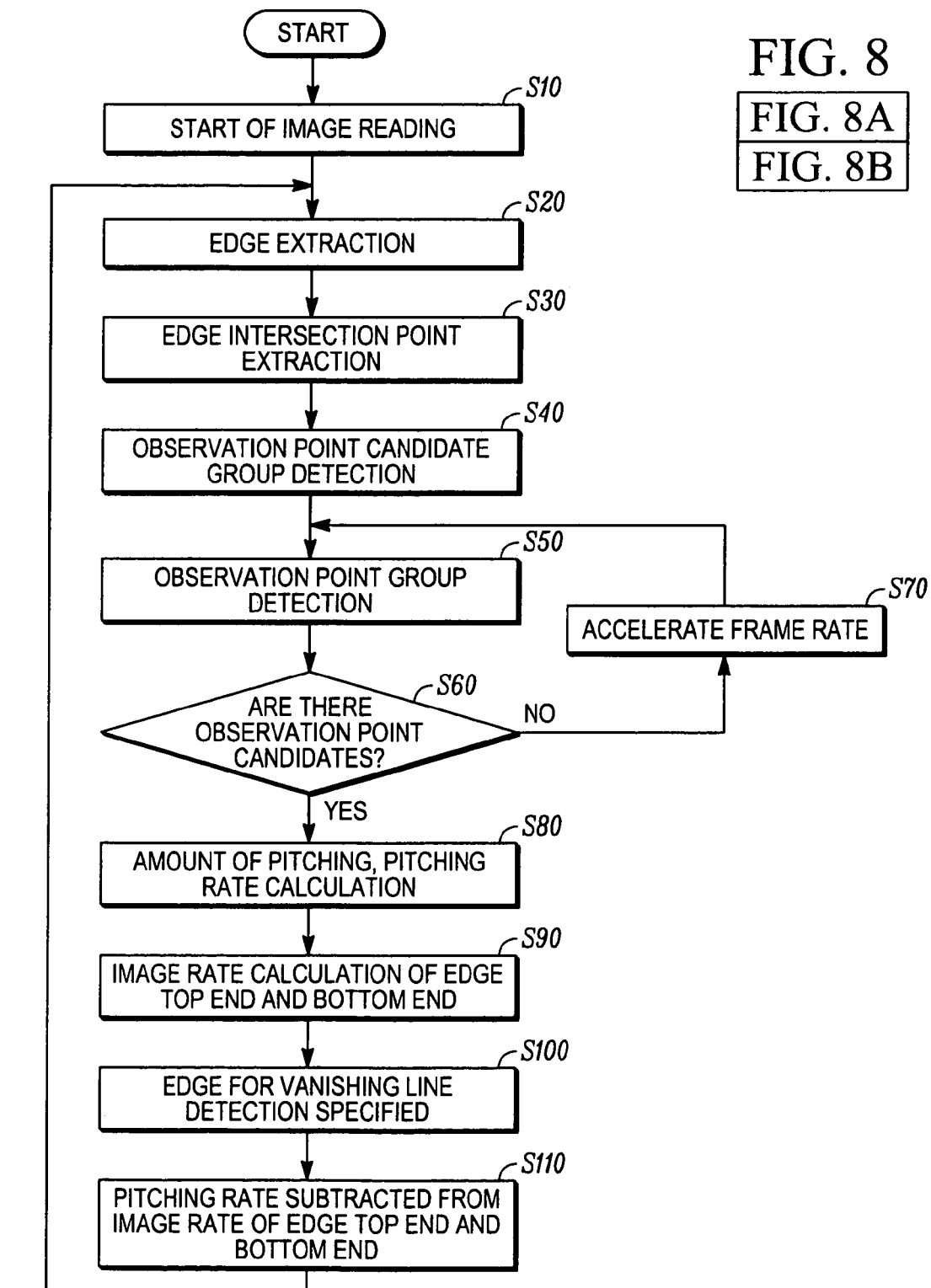
FIG. 8 is a flow chart showing processing by the vehicle-mounted image processor.
Figure 8B:
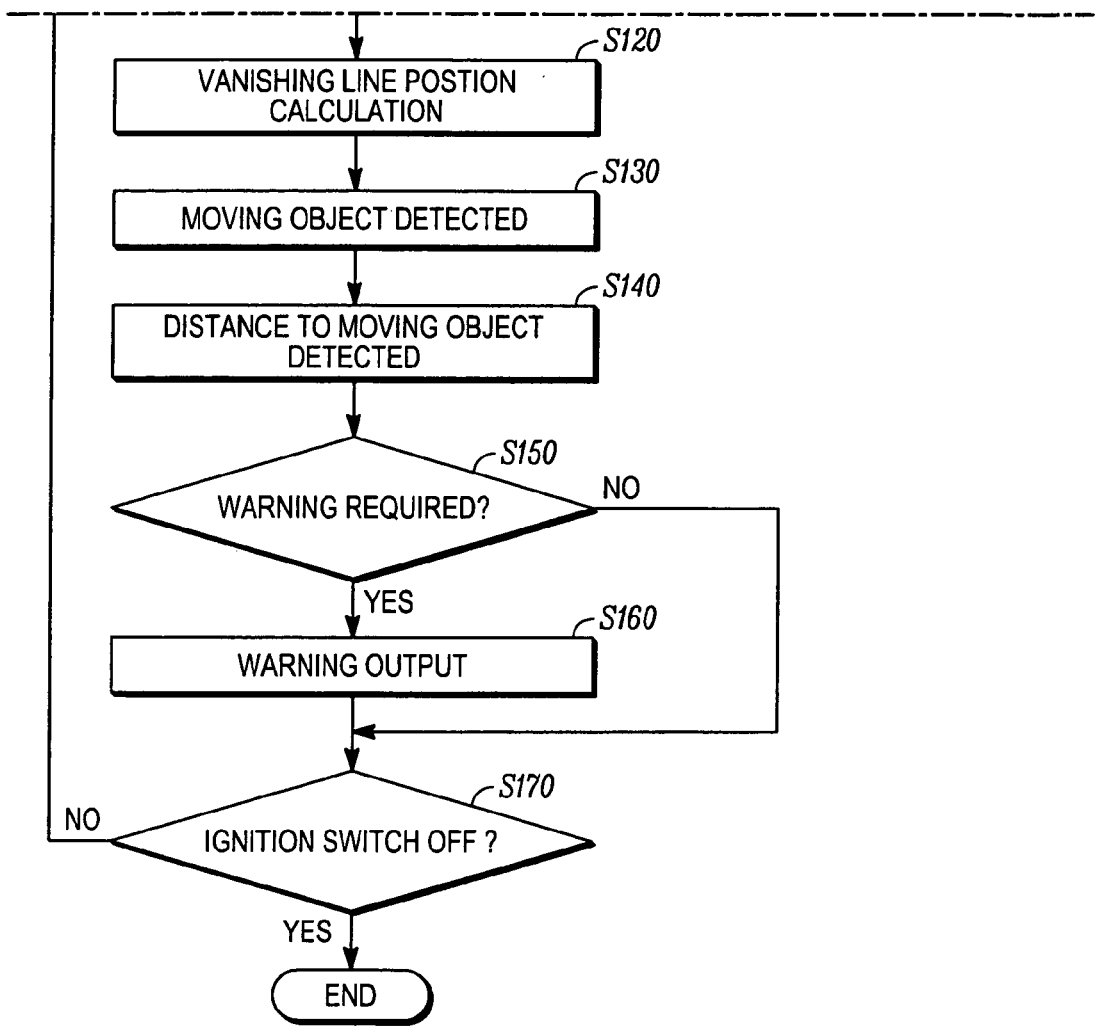

FIG. 8 is a flow chart showing processing by vehicle-mounted image processor 100. The processing shown in FIG. 8 is executed by controller 103 as a program that is started when the ignition switch of the vehicle with vehicle-mounted image processor 100 is turned on and power to vehicle-mounted image processor 100 is turned on. At step S10, reading of images starts for individual frames photographed continuously by camera 101 and processing proceeds to step S20. At step S20, an edge extraction filter is applied to the photographed image, and a vertical edge and a horizontal edge are extracted. Then, processing proceeds to step S30.

At step S30, the point at which the extracted vertical edge and horizontal edge intersect is extracted as an edge intersection point and processing proceeds to step S40. At step S40, the set of extracted edge intersection points for which the relative position of the edge intersection point does not change between multiple frames is detected as the observation point candidate group. Then, processing proceeds to step S50 and, from the detected group of multiple observation point candidates, the observation point candidate group for which the amount of change in vertical position orientation between frames in images is less than 1 pixel and for which the amount of change in position is the smallest is detected as the observation point group. Then, processing proceeds to step S60.

At step S60, it is determined whether detection of the observation point group for which the amount of change in vertical position orientation between frames in the images is less than 1 pixel has occurred. When the observation point group is determined not to have been detected, processing proceeds to step S70. After the frame rate of camera 101 is increased by a specified speed, processing returns to step S50 to again detect the observation point group. On the other hand, when the observation point group has been detected, processing proceeds to step S80. At step S80, as described above, the movement of the observation point group is observed, and the amount of pitching of the vehicle and the pitching rate are calculated. Then, processing proceeds to step S90.

At step S90, the top end and bottom end of all vertical edges present in the photographed image are detected, the image rate of both the top end and the bottom end is calculated, and processing proceeds to step S100. At step S100, from all the vertical edges detected, a vertical edge for which the velocity direction of the top end and the bottom end differs, and for which the bottom end is positioned at the very bottom in the photographed image, is specified as an edge for vanishing line detection, and processing proceeds to step S110. At step S110, the pitching rate of the vehicle is subtracted from the calculated image rate of the top end and bottom end of the edge for vanishing line detection, and processing proceeds to step S120, where the vanishing point position in the photographed image is calculated using the formula (1). The processing then proceeds to step S130.

In step S130, as described above, the entire photographed image is correlated with moving object shape patterns prepared in advance, and an object region in the photographed image in which a moving object is present is specified. Then, processing proceeds to step S140, where the bottommost point of the detected edge in the object region is detected, and the y coordinate value of this bottommost edge point, and the y coordinate value of the vanishing line are used to calculate the distance from the vehicle to the moving object using triangulation based on the height at which camera 101 is installed. Then, processing proceeds to step S150.

At step S150, it is determined whether a warning to the driver is required, based on the calculated distance from the vehicle to the moving object. When it is determined that a warning is required, processing proceeds to step S160, where a warning is given to the driver with monitor 104 and speaker 105, and processing proceeds to step S170. On the other hand, when it is determined that no warning is required for the driver, processing proceeds directly to step S170. At step S170, it is determined whether the vehicle ignition switch is turned off. When it is determined that the ignition switch is not off, processing returns to step S20, where processing is repeated. In contrast to this, when it is determined that the ignition switch is turned off, processing is completed.

With this embodiment explained above, functioning and effects as below can be obtained.

(1) From all the extracted edge intersection points, the set of edge intersection points for which the relative position of the edge intersection point does not change between multiple frames is detected as an observation point candidate group, and of these, the observation point candidate group for which the amount of change in vertical position between frames in the images is less than 1 pixel, and for which the amount of change in position is the smallest, is determined as the observation point group. Then, pitching by the vehicle will be detected by measuring the movement of the part at the observation point. Because of this, with the set of edge intersection points for which the relative position of the edge intersection point does not change between frames and for which, in addition, the change in vertical position orientation accompanying travel of the vehicle is less than 1 pixel, the vertical position in the images does not change, even when the relative distance between the vehicle and the edge intersection point changes. So when they move vertically, the fact that it is due to pitching by the vehicle is taken into account and pitching by the vehicle can be detected with high precision.

(2) The set of edge intersection points for which the relative position of the edge intersection point does not change between frames is detected as an observation point candidate group. Because of this, the set of edge intersection points for which the vertical position orientation changes in images only because of the occurrence of pitching can be extracted accurately as an observation point candidate group without being affected by a change in position in the images caused by a change in relative speed between the object and the vehicle, e.g., the distance between vehicles.

(3) For detecting an observation point group, when the amount of change in position between frames is 1 pixel or greater, the frame rate of camera 101 is raised at a prescribed incremental rate until the amount of change in the vertical position of the observation point candidate group with the least amount of change in position is less than 1 pixel. Because of this, change in vertical position in images accompanying approach by the vehicle of an object very near the vehicle is eliminated, and an observation point group can be detected for which the amount of change in the vertical position is actually less than 1 pixel.

(4) To calculate the vanishing line position, the image rates of the top end and the bottom end of the edge for vanishing line detection are calculated, the pitching rate is subtracted from the image rates, corrected image rates are calculated, and the vanishing line position is calculated based on the latter. Because of this, the effect of pitching can be eliminated and the vanishing line position can be calculated correctly.

(5) Since the vanishing line position is calculated by taking into account that the ratio of the corrected image rates of the top end and bottom end of the edge is equal to the ratio of the length from the vanishing line to the top end of the edge in the image and the length from the vanishing line to the bottom end of the edge in the image, the vanishing line position can be calculated correctly.

Figure 9:
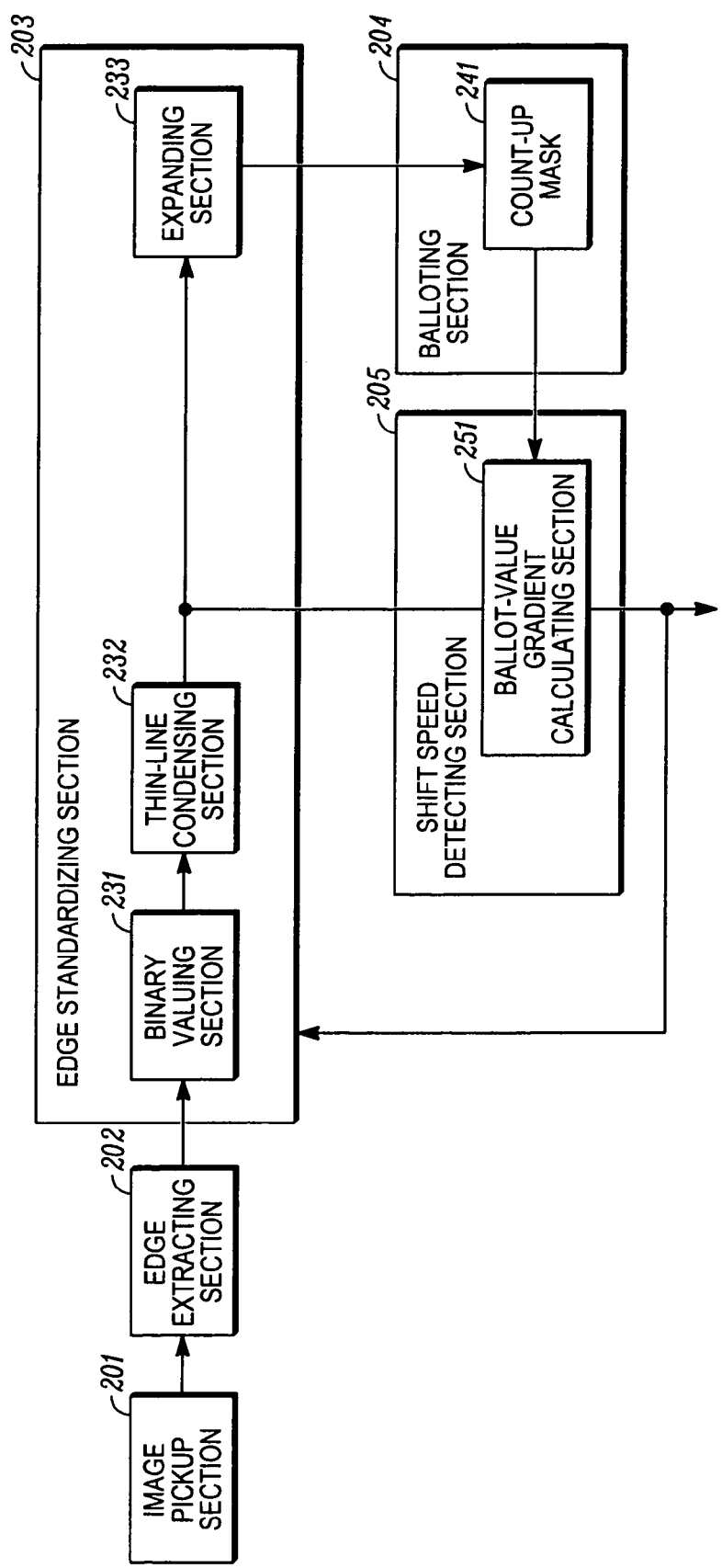
FIG. 9 is a block diagram showing a detailed structure an edge-width standardizing section.

As shown in FIG. 9, the edge standardizing section 203 is comprised of a binary valuing section 231 that allows the edge image, generated by the edge extracting section 202, to be valued in a binary state. The edge standardizing section 203 also includes a thin-line condensing section 232 that converts the edge width of the edge that is valued in the binary state by the binary valuing section 231 in a thin line to a given pixel number. Finally, the edge standardizing section 203 comprises an expanding section 233 that expands the edge width of the edge, which is formed in the thin line by the thin-line condensing section 232, to a given pixel number.

With the edge standardizing section 203 so configured, if the edge image is input from the edge extracting section 202, the binary valuing section 231 executes binary valuing operation on the edge image. During this binary valuing operation, a pixel of a pixel area whose edge is detected is allocated to be "1" while a pixel of a pixel area whose edge is not detected is allocated to be "0". Based on these allocated values, a binary value image is generated as shown in frame image (a) in FIG. 10.

Next, the thin-line condensing section 232 executes thin-line condensing operation for the binary valued image that is valued in a binary state by the binary valuing section 231. The thin-line condensing operation contracts the detected edge to a given pixel number. With the frame image (b) shown in FIG. 10, the edge width of the edge is condensed to a given pixel number of one pixel. Upon condensing the edge to a given pixel width in such a way, the thin-line condensing section 232 sets a center position for the edge.

The expanding section 233 executes an expanding operation for expanding the edge width of the edge whose line is condensed by the thin-line condensing section 232. During this expanding operation, the edge width is expanded in both shift directions of the edge, that is, in one shift direction away from a center position of the edge, set by the thin-line condensing operation, and in the other direction opposite to the one shift direction. With the frame image 1 in FIG. 10, the edge width is expanded in both directions by one pixel, i.e., in the shift direction (positively on the x-axis) away from the pixel position X, forming the center of the edge, and the other direction (negatively on the x-axis) opposite to the shift direction for thereby standardizing the edge width of the edge to three pixels in this example.

Upon executing the thin-line condensing and expanding operations in such a way, the edge standardizing section 203 standardizes the edge width of the edge, extracted by the edge extracting section 202, in a given pixel number toward the shift directions of the edge.

Although the edge width can be standardized according to these steps, an alternative may be such that the edge extracting section 202 detects a peak position of the detected edge after which the edge width is standardized in a way to cause the edge width to have pixel widths each by a given pixel number in the shift direction of the edge and in the other direction opposite the shift direction with respect to the edge peak position.

Next, the balloting section 204 executes the operation to count up the standardized edges standardized as set forth above. This count-up operation is implemented such that values of memory addresses of memory regions whose standardized edges are detected are counted up while the values of memory addresses of pixel areas whose standardized edges are not detected are initialized. More specifically, the count-up operation of the balloting section 204 is shown in FIG. 11.

Initially, it is supposed that in a frame image (c) at time t, the edge width is expanded from a pixel position, X, in both pixel directions, X−1 to the other pixel direction X+1, a shift direction of the edge and the other direction opposite to the shift direction by one pixel, respectively.

In this case, the balloting section 204 counts up ballot values of the pixel positions X=1, X and X+1, whose standardized edges are detected by the count-up mask 241 one by one, and a ballot value of the pixel areas, whose standardized edges are not detected, is reset.

In a frame image (d) in FIG. 11, since the standardized edges are detected on the pixel positions X−1, X and X+1 at time t, the ballot values are counted up at the respective pixel positions one by one such that the pixel position X+1 takes the ballot value of 1, the pixel position X takes the ballot value of 3 and the pixel position X−1 takes the ballot value of 5.

No edge shifts at time t+1, so the standardized edges are detected at the pixel positions X−1, X and X+1, and, as shown in the frame image (e) in FIG. 11, the ballot values of the pixel positions X−1, X and X+1 are further counted up one by one such that the pixel position X+1 takes the ballot value of 2, the pixel position X takes the ballot value of 4 and the pixel position X−1 takes the ballot value of 6.

At time t+2, the edge shifts in a positive direction on the x-axis by one pixel upon which the standardized edges are detected at the pixel positions X, X+1 and X+2. Accordingly, the ballot values of the pixel positions whose standardized edges are detected are counted up, while the ballot values of pixel positions whose standardized edge are not detected are reset. As a result, as shown by a frame image (f) in FIG. 11, the pixel position X+2 takes the ballot value of 1, the pixel position X+1 takes the ballot value of 3 and the pixel position X takes the ballot value of 5. In addition, the ballot value of the pixel position X−1, whose standardized edge is not detected, is reset to "0".

In such a way, the balloting section 204 counts up the ballot values of the pixel positions whose standardized edges are detected, while resetting ballot values of the pixel areas whose standardized edges are not detected.

While in FIG. 11, the ballot values are detected at a sum of three positions, i.e., the pixel positions X−1, X and X+1, as the pixel areas of the standardized edges, the ballot values of any positions may be detected provided that the gradient of the ballot values is obtained as will be described below.

Further, if the frame rate is set to be sufficiently higher than the speed in which the edge (at a central pixel position of the standardized edge) shifts, the standardized edges are detected a number of times on the same pixel areas for frame images successively appearing in time series. In the case of FIG. 11, the standardized edge in the pixel position X is detected two times, at times t and t+1. Consequently, the ballot value, resulting when the ballot values of the pixel areas whose standardized edges are detected, is substantially equivalent to a time interval (frame number) during which the standardized edges are detected in the relevant pixel area. Particularly, this means how many number of frames are needed after the edge has shifted for the minimum ballot value h, among the ballot values of the pixel areas on which the standardized edges are located, to be located on the same pixel area.

Subsequently, the shift speed detecting section 205 calculates a shift speed, a shift direction and a position of the edge. The shift speed detecting section 205 initially calculates a gradient of the ballot values of the pixel areas of the standardized edges. Depending on the gradient of the ballot value as calculated by the ballot-value gradient calculating section 251, the shift speed detecting section 205 calculates the shift direction, the shift speed and the position of the edge.

This calculation method is described with reference to FIG. 11. In case of the frame image (e) in FIG. 11, the pixel positions X−1, X and X+1 have the ballot values of 6, 4 and 2, respectively. Therefore, upon subtracting the ballot value 2 at the pixel position X+1 from the ballot value 6 at the pixel position X−1, the gradient of the ballot value can be calculated as H=(6*2)/2=2. This means that $H$={(Time Interval needed for Standardized Edge to shift from Pixel Position $X$−1 to Pixel Position $X$+1)}/(2 Pixels).

Accordingly, the gradient H of the ballot values is substantially equivalent to the time interval (frame number) needed for the standardized edges to pass across the pixel position X. That is, the gradient H of the ballot values is equivalent to obtain information about how many number of frames are needed for the standardized edge to shift by one pixel, and the shift speed 1/H of the edge can be calculated based on the gradient H of the ballot value.

In the frame image in FIG. 11, four frames are needed for the standardized edge to shift by one pixel and, hence, the shift speed of the edge can be calculated to be ¼ (pixel/frame).

Further, the shift direction of the edge can be judged on a size of the ballot value. The pixel area, appearing when the edge shifts and a new standardized edge is detected, has a ballot value of 1 that forms a minimal value among the ballot values of the respective pixel positions. Consequently, the ballot value in a direction in which the edge shifts is small, and the ballot value in a direction opposite to the direction in which the edge shifts is large. It thus becomes possible to judge the shift direction of the edge.

In addition, if the frame rate is set to be sufficiently higher than the speed at which the edge shifts, it is assumed that the object is moving at a constant speed. Moreover, among the ballot values of the pixel areas on which the standardized edges are located, the minimal ballot value "h" means that the standardized edge is located on the same position for a time interval in which the standardized edge is detected at the relevant pixel position, that is, the given number of frames needed after the edge has shifted.

From the foregoing, where the center position of the edge is X, the position of the edge can be expressed as below.

Current Position of Edge=$X+h/H$

In the frame image (e) in FIG. 11, since at time t+1 the edge is detected in the same pixel position two successive frames at the edge speed of ¼ (pixel/frame), the pixel position of the edge at time t+1 can be calculated to assume a position shifted from the pixel position by:

2(Frame)×{¼(Pixel/Frame)}=0.5 Pixel.

Upon calculating the shift speed, the shift direction and the position of the edge in the manner discussed, the shift speed detecting section 205 transmits the calculated shift speed to the edge standardizing section 203. Upon receipt of the shift speed, the edge standardizing section 203 alters the edge width of the edge to be standardized. In the frame image (f) in FIG. 11, although the edge width subsequent to the standardizing operation has three pixels in respect of the shift direction of the edge, the edge width in respect of the shift direction of the edge is altered to be greater than the three pixels when the received shift speed is high. In contrast, when the shift speed is low, the edge width in respect of the shift direction of the edge is altered to be smaller than the three pixels.

Thus, altering the edge width for standardization enables the edge width to be standardized such that the standardized edges overlap one another between the frame images successive in time series in accordance with the shift speed, making it possible to expand a range of the shift speed available for detection.

Additional background information with respect to edge extraction may be found in U.S. Publication No. 2006-0078165, published Apr. 13, 2006, and entitled "Motion Detection Apparatus and Motion Detection Method," which is hereby incorporated by reference in its entirety, and in Japanese Patent Applications Laid-open No. P2004-278250 with a filing data of Sep. 24, 2004 and Laid-open P2004-

279394 with a filing data of Sep. 27, 2004, both of which are hereby incorporated by reference.

This application is based on Japanese Patent Application No. 2005-141186, filed May 13, 2005, in the Japanese Patent Office, the entire contents of which are hereby incorporated by reference.

While various aspects of the vehicle-mounted image processor have been disclosed, it will be appreciated that many other variations may be incorporated without departing from the scope of the present invention. For example, camera 101 could be installed to photograph behind the vehicle, and the amount of pitching by the vehicle and the vanishing line position could be detected based on images from behind the vehicle photographed by camera 101. Additionally, if the velocity directions of the top end and the bottom end of all vertical edges present in a photographed image differ, the bottom end need not necessarily be positioned at the very bottom in the photographed image. Also, in place of the top end and bottom end of the vertical edge, any two edge intersection points from the same object for which the height position in the image and the velocity direction in the vertical orientation differ could be extracted and the two points could be used a feature points. It is intended by the following claims to cover these and any other departures from the disclosed embodiment which fall within the true spirit of the invention. The description of the invention is merely exemplary in nature, and thus, variations that do not depart from the gist of the invention are intended to be within the scope of the invention. Such variations are not to be regarded as a departure from the spirit and scope of the invention.

What is claimed is:

1. An image processor mounted to a vehicle for determining a distance between the vehicle and an object located outside the vehicle, the vehicle including imaging means for capturing images from in front of the vehicle, the image processor comprising:
    velocity information calculation means for calculating velocity information from images photographed by the imaging means;
    observation point group specification means operable for specifying, from the velocity information calculated by the velocity information calculation means, a set of observation points at which relative positions of velocity information do not change;
    pitching detection means configured to detect pitching of the vehicle based on the set specified by the observation point group specification means; and
    vanishing line calculation means configured to: extract any two points of differing height of an object present in an image as feature points, eliminate the pitching detected by the pitching detection means from the feature points, and calculate the position of a vanishing line based on the velocity ratio of the feature points after the length between the two feature points and pitching are eliminated.

2. The image processor of claim 1, wherein the vanishing line calculation means is further configured to eliminate an effect of pitching by subtracting the velocity of the pitching detected by the pitching detection means from a vertically oriented velocity of the feature points in the image.

3. The image processor of claim 2, wherein the velocity information calculation means is configured to perform edge extraction for images in individual frames photographed by the imaging means and extract a point at which an extracted edge in a vertical orientation and an extracted edge in a horizontal orientation intersect, and the edge intersection point that is extracted serves as the velocity information.

4. The image processor of claim 2, wherein the observation point specification means is configured to detect a velocity information set in which a change of vertical position in an image accompanying vehicle travel is less than 1pixel from the velocity information set in which the relative positions of velocity information in an image do not change between the images to specify the set as the observation point group.

5. The image processor of claim 4, wherein the velocity information calculation means is configured to perform edge extraction for images in individual frames photographed by the imaging means and extract a point at which an extracted edge in a vertical orientation and an extracted edge in a horizontal orientation intersect, and the edge intersection point that is extracted serves as the velocity information.

6. The image processor of claim 4, wherein the observation point group specification means is configured to detect the velocity information set in which the change in vertical position orientation in an image accompanying vehicle travel is less than 1pixel while a frame rate of the imaging means is speeded up.

7. The image processor of claim 6, wherein the velocity information calculation means is configured to perform edge extraction for images in individual frames photographed by the imaging means and extract a point at which an extracted edge in a vertical orientation and an extracted edge in a horizontal orientation intersect, and the edge intersection point that is extracted serves as the velocity information.

8. The image processor of claim 1, wherein the velocity information calculation means is configured to perform edge extraction for images in individual frames photographed by the imaging means and extract a point at which an extracted edge in a vertical orientation and an extracted edge in a horizontal orientation intersect, and the edge intersection point that is extracted serves as the velocity information.

9. The image processor of claim 1, wherein the observation point specification means detects a velocity information set in which a change of vertical position in an image accompanying vehicle travel is less than 1pixel from the velocity information set in which the relative positions of velocity information in an image do not change between the images to specify the set as the observation point group.

10. A method for determining a position of a vanishing line within an image captured by an image processor in a vehicle having an imaging means, the method comprising:
    calculating velocity information for images captured by the imaging means;
    selecting a set in which the relative positions of velocity information do not change from the calculated velocity information;
    detecting pitching by the vehicle based on the specified velocity information set;
    extracting as feature points, any two points of differing height on an object present in the image;
    eliminating from the feature points the pitching detected by the pitching detection means; and
    calculating the position of a vanishing line based on the velocity ratio of the feature points after the length between the two feature points and pitching are eliminated.

11. A vehicle comprising the image processor of claim 1, and further comprising:
    the imaging means for capturing images from in front of the vehicle; and wherein the velocity information calculation means, the observation point group specification means, the pitching detection means and the vanishing line calculation means are included in a controller.

12. The vehicle of claim 11, wherein the controller is further configured to eliminate an effect of pitching by subtracting the velocity of the detected pitching from a vertically oriented velocity of the feature points.

13. The vehicle of claim 12, wherein the controller is further configured to perform edge extraction for images in individual frames photographed by the imaging means and extract a point at which an extracted edge in a vertical orientation and an extracted edge in a horizontal orientation intersect, and the edge intersection point that is extracted serves as the velocity information.

14. The vehicle of claim 12, wherein the observation point specification means is configured to detect a velocity information set in which a change of vertical position in an image accompanying vehicle travel is less than 1pixel from the velocity information set in which the relative positions of velocity information in an image do not change between the images to specify the set as the observation point group.

15. The vehicle of claim 14, wherein the velocity information calculation means is configured to perform edge extraction for images in individual frames photographed by the imaging means and extract a point at which an extracted edge in a vertical orientation and an extracted edge in a horizontal orientation intersect, and the edge intersection point that is extracted serves as the velocity information.

16. The vehicle of claim 14, wherein the observation point group specification means is configured to detect the velocity information set in which the change in vertical position orientation in an image accompanying vehicle travel is less than 1pixel while a frame rate of the imaging means is speeded up.

17. The vehicle of claim 16, wherein the velocity information calculation means is configured to perform edge extraction for images in individual frames photographed by the imaging means and extract a point at which an extracted edge in a vertical orientation and an extracted edge in a horizontal orientation intersect, and the edge intersection point that is extracted serves as the velocity information.

18. The vehicle of claim 11, wherein the controller is further configured to perform edge extraction for images in individual frames photographed by the imaging means and extract a point at which an extracted edge in a vertical orientation and an extracted edge in a horizontal orientation intersect, and the edge intersection point that is extracted serves as the velocity information.

19. The vehicle of claim 11, wherein the observation point specification means detects a velocity information set in which a change of vertical position in an image accompanying vehicle travel is less than 1pixel from the velocity information set in which the relative positions of velocity information in an image do not change between the images to specify the set as the observation point group.

* * * * *